United States Patent
Humbert et al.

(10) Patent No.: US 11,102,627 B1
(45) Date of Patent: Aug. 24, 2021

(54) SERVICE TYPE SYMBOLS

(71) Applicant: T-Mobile USA, Inc., Bellevue, WA (US)

(72) Inventors: John Humbert, Roeland Park, KS (US); Scott Francis Migaldi, Cary, IL (US); Hsin-Fu Henry Chiang, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/791,969

(22) Filed: Feb. 14, 2020

(51) Int. Cl.
*H04W 4/18* (2009.01)
*H04L 29/06* (2006.01)
(Continued)

(52) U.S. Cl.
CPC ............ *H04W 4/18* (2013.01); *H04B 7/0632* (2013.01); *H04L 5/0083* (2013.01);
(Continued)

(58) Field of Classification Search
CPC ....... H04W 4/18; H04W 48/18; H04W 4/022; H04W 48/06; H04W 28/16; H04W 8/18; H04W 48/16; H04W 76/10; H04W 28/26; H04W 72/04; H04W 36/08; H04W 76/15; H04W 36/14; H04W 84/042; H04L 67/20; H04L 5/0083; H04L 65/608; H04L 67/38; H04L 41/0806; H04L 41/0893; H04L 41/5051; H04B 7/0632; H04B 7/0486; H04B 7/0413; Y02D 70/10; H04M 15/66

See application file for complete search history.

(56) References Cited

U.S. PATENT DOCUMENTS 8,565,747 B2 10/2013 Karaoguz et al.
8,843,181 B2 9/2014 Seibert et al.
(Continued)

FOREIGN PATENT DOCUMENTS

GB 2505680 A 3/2014
WO WO2016116145 A1 7/2016
(Continued)

OTHER PUBLICATIONS

The Extended European Search Report dated Sep. 23, 2020 for European Patent Application No. 20168539.3, 10 pages.
(Continued)

*Primary Examiner* — Fred A Casca
(74) *Attorney, Agent, or Firm* — Lee & Hayes, P.C.

(57) ABSTRACT

A service type symbol may be presented on a display of a communication device to indicate a type of service supported or unsupported on the communication device over a network to which the communication device is presently connected. The communication device may determine a value of a parameter, may determine, based at least in part on the value of the parameter, a service type symbol from a set of multiple different service type symbols to present on a display of the communication device, and may present the symbol on the display. Service type symbols might include, among others, a video symbol corresponding to a video streaming service, a voice symbol corresponding to a voice calling service, a basic data symbol corresponding to a basic data service.

16 Claims, 8 Drawing Sheets

(51) Int. Cl.
| | |
|---|---|
| *H04B 7/06* | (2006.01) |
| *H04W 4/021* | (2018.01) |
| *H04W 48/18* | (2009.01) |
| *H04L 5/00* | (2006.01) |
| *H04L 29/08* | (2006.01) |
| *H04W 48/06* | (2009.01) |

(52) U.S. Cl.
CPC ............ *H04L 65/608* (2013.01); *H04L 67/20* (2013.01); *H04L 67/38* (2013.01); *H04W 4/022* (2013.01); *H04W 48/06* (2013.01); *H04W 48/18* (2013.01)

(56) References Cited

U.S. PATENT DOCUMENTS

| | | | |
|---|---|---|---|
| 9,031,606 | B2 | 5/2015 | Daniel |
| 9,277,345 | B2 | 3/2016 | Lui et al. |
| 9,615,304 | B2 | 4/2017 | Breuer et al. |
| 9,628,115 | B1 | 4/2017 | Tsai et al. |
| 9,907,007 | B1 | 2/2018 | Xue et al. |
| 10,027,573 | B2 | 7/2018 | Shaw et al. |
| 10,397,840 | B2 | 8/2019 | Shaw et al. |
| 2006/0062149 | A1 | 3/2006 | Bednasz |
| 2008/0014934 | A1 | 1/2008 | Balasubramanian et al. |
| 2009/0137247 | A1 | 5/2009 | Mok |
| 2010/0099405 | A1* | 4/2010 | Brisebois ............ H04L 41/0893 455/434 |
| 2010/0135183 | A1* | 6/2010 | Suzuki .............. H04M 3/42127 370/252 |
| 2012/0258715 | A1 | 10/2012 | Souissi et al. |
| 2013/0110565 | A1 | 5/2013 | Means, Jr. et al. |
| 2013/0237220 | A1 | 9/2013 | Lee et al. |
| 2015/0045020 | A1 | 2/2015 | Wang et al. |
| 2015/0173004 | A1 | 6/2015 | Nigam et al. |
| 2015/0271317 | A1* | 9/2015 | Nelson .............. H04M 1/72519 715/753 |
| 2016/0192370 | A1 | 6/2016 | Chan et al. |
| 2016/0227475 | A1 | 8/2016 | Zhu et al. |
| 2016/0249268 | A1 | 8/2016 | Usui et al. |
| 2018/0019857 | A1 | 1/2018 | Kazmi et al. |
| 2018/0075798 | A1 | 3/2018 | Nho et al. |
| 2018/0082633 | A1 | 3/2018 | Tan et al. |
| 2018/0332659 | A1 | 11/2018 | Hwang et al. |
| 2018/0368016 | A1* | 12/2018 | Lee ..................... H04B 17/318 |
| 2019/0069205 | A1 | 2/2019 | Lee et al. |
| 2019/0069229 | A1 | 2/2019 | Lee et al. |
| 2019/0379469 | A1 | 12/2019 | Lu et al. |
| 2020/0068456 | A1 | 2/2020 | Humbert et al. |
| 2020/0068482 | A1 | 2/2020 | Lu et al. |
| 2020/0068638 | A1 | 2/2020 | Au et al. |
| 2020/0084682 | A1 | 3/2020 | Wang et al. |
| 2020/0092774 | A1 | 3/2020 | Sharma et al. |
| 2020/0112845 | A1 | 4/2020 | Zhao et al. |
| 2020/0344839 | A1 | 10/2020 | Kwok et al. |

FOREIGN PATENT DOCUMENTS

| | | |
|---|---|---|
| WO | WO2016188701 A1 | 12/2016 |
| WO | WO2017196106 A1 | 11/2017 |

OTHER PUBLICATIONS

"LS Reply to 3GPP SA2 on Status Icon related to 5G", retrieved on Jan. 21, 2018 at «http://www.3gpp.org/ftp/Meetings%5F3GPP% 5FSYNC/SA2/Docs/», [retrieved on 2018—vol. SA WG2, No. Gothenburg, Sweden: Jan. 22, 2018-Jan. 26, 2018, 3GPP Draft, 3rd Generation Partnership Prokect (3GPP), Jan. 2018, pp. 1-4.

Office Action for U.S. Appl. No. 16/120,605, dated Oct. 8, 2020, Lu, "Network Symbol Display in Dual Connectivity Regions", 13 Pages.

Office Action for U.S. Appl. No. 16/442,040, dated Nov. 10, 2020, Kwok, "5G Wireless Network Connection Symbol Policy", 14 Pages.

Office Action for U.S. Appl. No. 16/378,179, dated Jan. 24, 2020, Lu, "Variable Interval Signal Scanning in Dual Connectivity Communication Networks", 10 Pages.

Office Action for U.S. Appl. No. 16/120,605, dated May 26, 2020, Lu, "Network Symbol Display in Dual Connectivity Regions", 11 Pages.

Office Action for U.S. Appl. No. 16/442,040, dated Jul. 20, 2020, Kwok, "5G Wireless Network Connection Symbol Policy", 11 Pages.

Office Action for U.S. Appl. No. 16/378,179, dated Jun. 25, 2020, Lu, "Variable Interval Signal Scanning in Dual Connectivity Communication Networks", 10 pages.

Intel Corporation, "Dual Registration Solution for 5GS/EPS Interworking", R2-1802964, 3GPP TSG RAN WG2 Meeting #101, Athens, Greece, Feb. 16, 2018, 4 pgs.

Office Action for U.S. Appl. No. 16/378,179, dated Apr. 2, 2020, Lu, "Variable Interval Signal Scanning in Dual Connectivity Communication Networks", 9 Pages.

Office Action for U.S. Appl. No. 16/378,202, dated Nov. 22, 2019, Humbert, Displaying Network Availability in Dual Connectivity Networks, 10 pages.

Office Action for U.S. Appl. No. 16/378,179, dated Aug. 15, 2019, Lu, "Variable Interval Signal Scanning in Dual Connectivity Communication Networks", 8 pages.

The PCT Search Report and Written Opinion dated Oct. 1, 2019, for PCT Application No. PCT/US2019/034110, 11 pages.

The PCT Search Report and Written Opinion dated Dec. 30, 2019 for PCT Application No. PCT/US2019/047553, 12 pages.

Office Action for U.S. Appl. No. 16/442,040, dated Feb. 18, 2021, Kwok, "5G Wireless Network Connection Symbol Policy", 17 Pages.

* cited by examiner

SERVICE TYPE SYMBOLS

BACKGROUND

Communication devices, such as smartphones, often have a status bar that shows, among other things, the current signal strength and/or signal quality of the current wireless connection with a base station. In addition, the status bar may have a network indicator, such as an icon or symbol, that indicates the type of network (or the type of air interface technology) being used for the current wireless connection. For example, the network indicator might comprise a "2G" symbol, "WCDMA" symbol, "WiFi" symbol, "3G" symbol, a "4G" symbol, a "4G LTE" symbol, a "LTE" symbol, a "5G" symbol, a "$5G_E$" symbol, a "H" symbol, an "E" symbol, and the like.

These conventional network indicators are unintelligible to many users. For example, notwithstanding the display of a particular network indicator (e.g., 4G) in the status bar, a user—especially an unsophisticated one—often does not know which types of services (e.g., video streaming services, voice calling services, gaming services, etc.) might be supported on his/her communication device. Instead, many users simply expect the communication device to work for whatever service they desire to access, and users often don't realize a service is unsupported via their communication device until they actually try to access the service and cannot use the service the way it is intended to be used (e.g., the communication device cannot make a call, cannot stream a video, etc.). It takes a sophisticated user (e.g., a radio communication expert or engineer) to understand what these conventional network indicators actually mean. Even then, a sophisticated user may not know what types of services are actually supported until he/she tries to access those services via the communication device.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
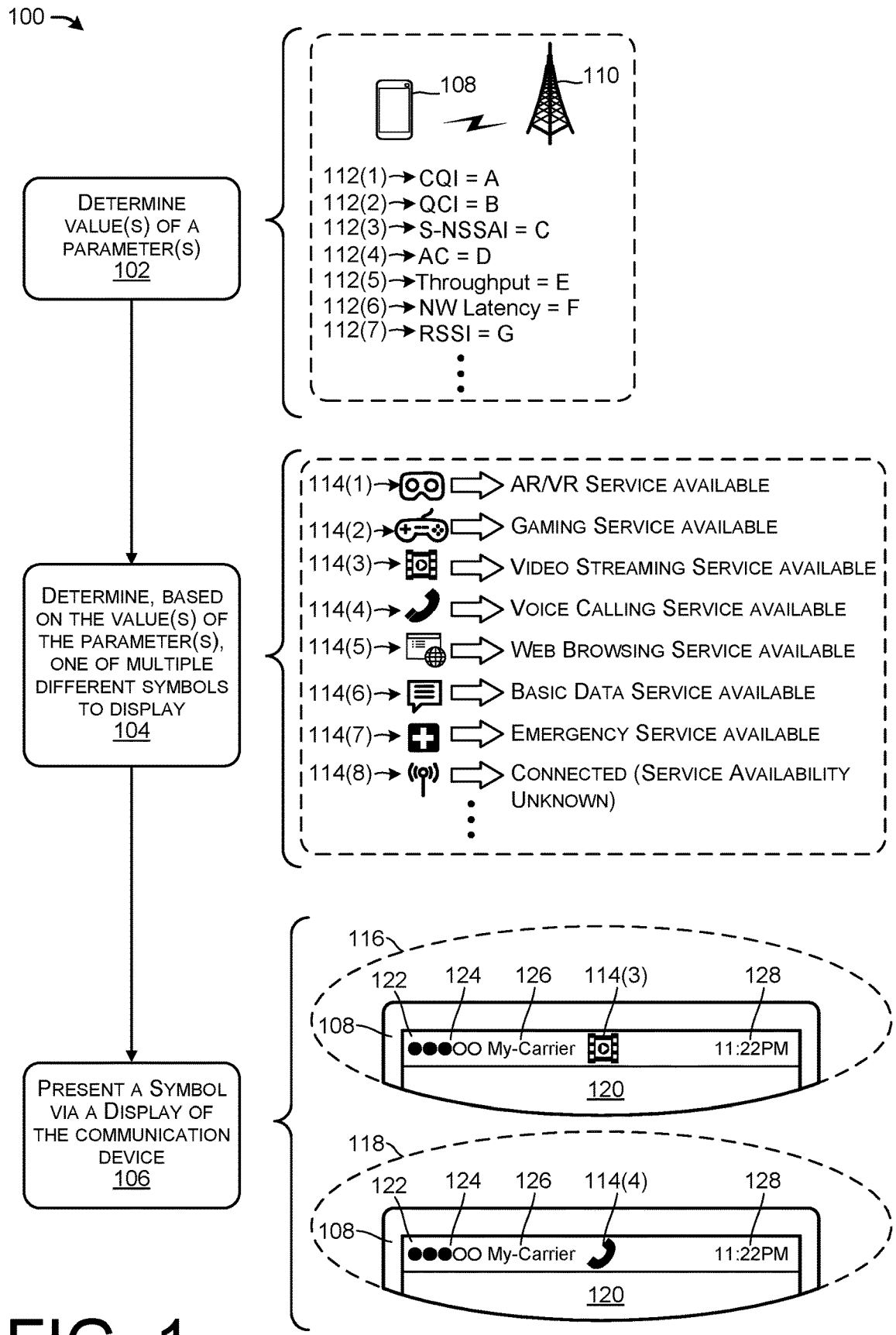
FIG. 1 illustrates a pictorial flow diagram for presenting, on a display of a communication device, a service type symbol indicative of a type of service supported on the communication device, the service type symbol determined based on a value(s) of a parameter(s) determined by the communication device.

Described herein are techniques for determining which of multiple different service type symbols to present on a display (e.g., in the status bar) of a communication device, when the communication device is operating in a network (e.g., a cellular network) of a wireless communications provider. These service type symbols are indicative of particular types of services, and, when a given symbol is presented on the display of the communication device, the symbol may indicate to the user of the communication device that a type of service corresponding to the displayed symbol is supported on the communication over a network to which the communication device is presently connected. This helps set the user's expectations for what types of services are supported and what types of services are unsupported. As used herein, a type of service is "supported" on (or by) a communication device if the type of service can be accessed via the communication device at an above-threshold quality level. For example, a video streaming service may be considered to be "supported" on a communication device if a video can be streamed to, and played back on, the communication device without interruption (e.g., without playback stopping intermittently due to insufficient bandwidth over the network). By contrast, the video streaming service may be considered to be "unsupported" on a communication device if a video cannot be streamed to the communication device due to a lack of connectivity to the type of service, or if the video cannot be played back on the communication device due to insufficient bandwidth over the network notwithstanding connectivity to the video streaming service. For example, if a user tries to stream a video on his/her communication device, but the video does not play at all the video streaming service may be considered to be unsupported due to an unavailability of the video streaming service. As another example, if a user tries to stream a video on his/her communication device, but the video playback stops and starts intermittently, the video streaming service may be considered to be unsupported, not due to unavailability of the service, but due to the service's failure to be accessible on the communication device at an above-threshold quality level.

Individual service type symbols might include, without limitation, a video symbol corresponding to a video streaming service, a voice symbol corresponding to a voice calling service, a web browsing symbol corresponding to a web browsing service, a basic data symbol corresponding to a basic data service, a gaming symbol corresponding to a gaming service, an emergency symbol corresponding to an emergency service, an augmented reality (AR) and virtual reality (VR) symbol corresponding to an AR service and/or a VR service, and the like. In an illustrative example, if a communication device, at a given moment, is capable of supporting a video streaming service, logic of the communication device may determine to present a video symbol on the display to indicate that the video streaming service is presently supported on the communication device over the network to which it is presently connected. Because a set of multiple different service type symbols may be defined according to a hierarchy, the video symbol may also indicate that additional types of services that are below the level of a video streaming service are also supported on the communication device, such as a voice calling service, a basic data service, an emergency service, and the like. If, after displaying the video symbol, the communication device then moves to a different location, and/or if radio conditions degrade (e.g., if signal coverage becomes weaker, or if coverage is spotty) and the video streaming service becomes unsupported on the communications device, the logic of the communication device may remove the video symbol from the display, and may present different symbol, such as a voice symbol, on the display to indicate that a different, lower-level service, such as a voice calling service, is still presently supported on the communication device over the network, even though the video streaming service has become unsupported. This is merely one illustrative example, and there may be a multitude of different service type symbols from which a symbol can be selected for display at any given moment.

The described techniques may provide a user of a communication device with more clarity regarding the type(s) of service(s) that may be currently supported on the communication device over a network at any given moment. This improved clarity may be achieved, in part, by the communication device being configured to display one of multiple different service type symbols described herein (instead of, or in addition to, displaying the conventional network indicators described above, such as "3G," "4G," "5G," etc.). The service type symbols described herein allow for better communicating to a user what service(s) is/are supported using a communication device, which, in turn, assists the user with understanding what type of client applications they can expect to function properly on the communication device. For example, instead of, or in addition to, displaying the conventional 5G network indicator, the communication device described herein may be configured to display a service type symbol that corresponds to a video streaming service, such as a video symbol. As another example, instead of, or in addition to, displaying the conventional 3G network indicator, the communication device described herein may be configured to display a service type symbol that corresponds to a basic data service, such as a basic data symbol. When a basic data symbol is presently displayed on the communication device, and when a video symbol is omitted from the display, the user may understand that a video streaming service is presently unsupported, and may, therefore, refrain from launching a video streaming client application on the communication device. The user would know, from the basic data symbol, for example, that launching a video streaming client application in the present radio conditions is likely to result in less-than-optimal video playback. By contrast, using conventional methods, if the communication device merely displays a "3G" network indicator without service type indicator, the user may believe he/she can launch a video streaming client application to stream a movie or a television show over the network with optimal playback quality, yet, when the user tries to stream the video, the video may not play at all (e.g., a client application may display a notification such as "Failure to play video", "Failure to load data", etc.), or the video may stop and start sporadically and/or with very low resolution of image frames. This, in turn, needlessly consumes computing resources, including, without limitation, processing resources, power resources (e.g., battery), network bandwidth resources, display resources, etc., of the communication device and/or of one or more network devices. Thus, by conveying intelligible information to users via service type symbols, the techniques and systems described herein can conserve computing resources.

In some examples, the communication device described herein is configured to determine one or more values of a parameter, or of multiple parameters that are used to determine which of multiple different service type symbols to present on the display of the communication device. Various example parameters that are usable for this purpose are described in more detail below. In some embodiments, a policy may be accessible to the communication device, the policy specifying criteria for presenting individual symbols from a set of multiple different service type symbols on the display. In some embodiments, the value(s) of the parameter may be provided as input to a machine learning model(s). Using the policy and/or the machine learning model(s), a determination of which symbol to present can be made, either by the communication device or by a network device that instructs the communication device to present a particular service type symbol. In some embodiments, determining which service type symbol to present may comprise determining whether one or more criteria (for a given type of service) are satisfied by the value(s) of the parameter(s) determined by the communication device. For example, logic of the communication device may compare a parameter value(s) to a predetermined range(s) of values, and/or to a predetermine value(s), to determine whether the parameter value(s) is/are within the range(s) and/or equal to the predetermined value(s). In general, the parameter values described herein may be indicative of the present radio conditions in the environment of the communication device, or the parameter values may be indicative of the capabilities of the communication device or of a network device (e.g., a modem) to which the communication device is connected, and/or the parameter values may be indicative of a state or characteristic of the communication device or of a network to which the communication device is connected. Thus, the parameter value(s) provide the communication device with some level of knowledge as to what types of services might be supported over the network, and what other types of services might not be supported over the network.

In an example process, a communication device may determine a value of a parameter, and may determine, based at least in part on the value of the parameter, a symbol from a set of multiple different symbols to present on a display of the communication device. In some embodiments, the symbol to present on the display indicates a type of service that is supported on the communication device over a network to which the communication device is presently connected. The communication device may then present the symbol on the display (e.g., to indicate the type of service presently supported on the communication device over the network). In some embodiments, the symbol may comprise at least one of a video symbol indicating that a video streaming service is supported on the communication device, or a voice symbol indicating that a voice calling service is supported on the communication device over the network. In some embodiments, the symbol may comprise at least one of the voice symbol or a basic data symbol indicating that a basic data service is supported on the communication device over the network. Additionally, or alternatively, the symbol may comprise other example symbols described herein.

Although the techniques and systems described herein are often described in the context of 4G and 5G networks, the techniques described herein may also be used with different network types, standards, and technologies. That is, the techniques may be used more generally for first and second wireless communication networks (and possibly additional networks), where a 4G network is an example of the first wireless communication network and a 5G network is an example of the second wireless communication network.

The systems, devices, and techniques described herein can improve the functioning of a device (e.g., a communication device, a network device, etc.) by intelligently presenting a service type symbol indicative of a type of service supported on the communication device based at least in part on a determined parameter value(s). Presenting a service type symbol in accordance with the techniques discussed herein can improve a user experience by informing users, using intelligible symbols, about types of services that are supported and associated expectations for the functional operation of client applications and related processes on the communication device. The techniques and systems described herein may improve a functioning of a network by reducing initiation of communications where network resources are not supported, which may reduce signaling and associated congestion. These and other improvements to the functioning of a computer and network are discussed herein.

FIG. 1 illustrates a pictorial flow diagram 100 for presenting, on a display of a communication device, a service type symbol indicative of a type of service supported on the communication device, the service type symbol determined based on a value(s) of a parameter(s) determined by the communication device.

At operation 102, a process can include determining a value(s) of a parameter(s). At operation 104, the process can include determining, based at least in part on the value of the parameter, a symbol from a set of multiple different symbols to present on the display of the communication device. The symbol to present on the display may indicate a type of service that is supported on the communication device over a network to which the communication device is presently connected. At operation 106, the process can include presenting the symbol on the display of the communication device. These operations will now be described in more detail, by way of nonlimiting examples.

At operation 102, the value(s) may be determined by the communication device 108. The communication device 108 may be presently connected to a network and/or operating in the network, such as a cellular network of a wireless communications provider. As shown in FIG. 1, the communication device 108 may be connected to the network via a wireless access point 110, such as a base station (e.g., cell tower) of a radio access network (RAN). In some embodiments, the communication device 108 may be connected, yet not actively involved in a communication session (e.g., a phone call). This state of the communication device 108 is often referred to herein as an "idle state" or an "idle mode", which is often the state of the communication device 108 when a user is carrying the device 108 in his/her pocket or purse and not presently using the communication device 108. At operation 102, the communication device 108 may determine the value(s) of the parameter independent of other devices (e.g., by taking measurements, such as signal strength, etc.), or at the direction of other devices, such as network devices. Additionally, or alternatively, the communication device 108 may determine the value(s) at operation 102 by receiving the value(s) from another device, such as a network device that sends the value(s) to the communication device 108 via the wireless access point 110.

It is to be appreciated that the communication device 108 can be connected to one or more networks in various ways at operation 102. For example, the communication device 108 may be connected to one or more of a first network (e.g., a 5G network) and/or a second network (e.g., a 4G network). In the case where the communication device 108 is within a geographical area indicative of the first network and the second network, the communication device 108 may be connected via dual connectivity. In some examples, the communication device 108 can be anchored via one or more networks in this manner. In this running example, each of the first network (e.g., 5G network) and the second network (e.g., 4G network) may have different coverage areas and/or frequency resources, or they may have the same coverage areas and/or frequency resources. For instances, a 5G network and a 4G network may implement Band 41 (e.g., 2.5 GHz) frequency resources. In some embodiments, a 5G network may be associated with a mmWave frequency resource (or other frequency resource different than a 4G network). For example, a 5G network may represent a mmWave frequency resource where the 4G network may represent a Band 2 (e.g., 1900 MHz, "B2"), Band 66 (e.g., 1700 MHz, "B66"), Band 12 (e.g., 700 MHz, "B12"), Band 71 (e.g., 600 MHz, "B71"), and the like. It is to be understood that the communication device 108 may be in range of one or more of these example networks at operation 102 at a time at which the value(s) of the parameter(s) is determined.

Various examples of parameters 112 whose values may be determined at operation 102 are shown to the right of operation 102 in FIG. 1, and it is to be appreciated that the determination at operation 102 may be to determine a single value of a single parameter 112, multiple values of a single parameter 112, or multiple values of multiple parameters 112. In one example, the operation 102 can include determining a value ("A") of a Channel Quality Indicator (CQI) parameter 112(1). The CQI parameter 112(1) may convey information indicative of a downlink transmission data rate. The value ("A") of the CQI parameter 112(1) may comprise a 4-bit integer, and may be within a range of values (e.g., from 0 to 30). The value ("A") of the CQI parameter 112(1) may be determined at operation 102 based on an estimation, by the communication device 108, of the channel quality using a downlink cell specific reference signal. In some embodiments, the communication device 108 may determine (e.g., measure) one or more of the following channel parameters including, without limitation, a signal-to-interference and noise ratio (SINR), a signal-to-noise ration (SNR), a signal-to-noise plus distortion ration (SNDR), a power of the received signal, data rate, modulation and/or coding rate, throughput, packet error rate (PER), etc., and the communication device 108 may look up a corresponding value ("A") of the CQI parameter 112(1) that corresponds to the determined (e.g., measured) channel parameter. A higher value ("A") of the CQI parameter 112(1) can mean that high-demand types of services (e.g., gaming, video streaming, etc.) may be supported, while a lower value ("A") of the CQI parameter 112(1) can mean that low-demand types of services (e.g., basic data, emergency, etc.) may be supported Additionally, or alternatively, the operation at 102 can include determining a value ("B") of a Quality of Service Class Identifier (QCI) parameter 112(2). The QCI parameter 112(2) can be used as a reference to a set of Access Network-related QoS parameters, and the value ("B") of the QCI parameter 112(2) may be a scalar number, each different scalar number being associated with a different Packet Delay Budget value and Packet Loss Rate value, as well as other QoS related parameters. In some embodiments, the value ("B") of the QCI parameter 112(2) may be within a range of values (e.g., from 0 to 9). A higher value ("B") of the QCI parameter 112(2) can mean that high-demand types of services (e.g., gaming, video streaming, etc.) may be supported, while a lower value ("B") of the QCI parameter 112(2) can mean that low-demand types of services (e.g., basic data, emergency, etc.) may be supported.

Additionally, or alternatively, the operation at 102 can include determining a value ("C") of a Single Network Slice Selection Assistance Information (S-NSSAI) parameter 112 (3). Network slicing is a feature of 5G networks. In 3GPP, a network slice is a logical end-to-end network that can be dynamically created. A given communication device, such as the communication device 108, may access one or more slices over the same Access Network (e.g., over the same radio interface). Each slice may service a particular service type (e.g., gaming, Internet-of-Things (IoT), voice calling and text, etc.) with agreed upon Service-Level Agreement (SLA). A given network slice may be identified by the value ("C") of the S-NSSAI parameter 112(3) that is assigned to the network slice. Accordingly, the communication device 108 can determine what network slice it is currently camped on by determining the value ("C") of the S-NSSAI parameter 112(3), and the particular network slice may dictate the types of services that are supported on the communication device 108 on that network slice. In some embodiments, the value ("C") of the S-NSSAI parameter 112(3) may be within a range of values (e.g., from 0 to 5).

Additionally, or alternatively, the operation at 102 can include determining a value ("D") of an Access Class (AC) parameter 112(4). Access Class Barring (ACB) may be used to control the access attempts of communication devices that belong to one or more ACs of a set of multiple ACs. Accordingly, the value ("D") of the AC parameter 112(4) of the communication device 108 may dictate which types of services are supported on the communication device 108 over the network to which the device 108 is presently connected. For example, the value ("D") of the AC parameter 112(4) determined by the communication device 108 may indicate that the device 108 is currently barred from accessing a video streaming service, a gaming service, or the like. This may be used in a disaster scenario (e.g., a major earthquake, flood, wildfire, etc.) where capacity of the network can be reserved for important services, such as an emergency service, a basic data service, voice calling service, etc., while other non-critical services can be barred on communication devices that are located in the geographical area where the disaster has occurred.

Additionally, or alternatively, the operation at 102 can include determining a value ("E") of a data throughput parameter 112(5). The data throughput may be yet another estimate of signal quality or channel quality, and may be expressed in any suitable units of measurement, such as kilobits per second (kbps). The value ("E") of the data throughput parameter 112(5) may be a value received from a network device (e.g., broadcast via the wireless access point 110), and/or a value derived by the communication device 108 (e.g., through measurement while transmitting test packets, etc.). A higher value ("E") of the data throughput parameter 112(5) can mean that high-demand types of services (e.g., gaming, video streaming, etc.) may be supported, while a lower value ("E") of the data throughput parameter 112(5) can mean that low-demand types of services (e.g., basic data, emergency, etc.) may be supported.

Additionally, or alternatively, the operation at 102 can include determining a value ("F") of a network latency parameter 112(6). The value ("F") of the network latency parameter 112(6) may be expressed as a unit of time (e.g., milliseconds), and may be a value received from a network device (e.g., broadcast via the wireless access point 110), and/or a value derived by the communication device (e.g., through a round trip time measurement using test packets, etc.). A higher value ("F") of the network latency parameter 112(6) can mean that low-demand types of services (e.g., basic data, emergency, etc.) may be supported, while a lower value ("F") of the network latency parameter 112(6) can mean that high-demand types of services (e.g., gaming, video streaming, etc.) may be supported.

Additionally, or alternatively, the operation at 102 can include determining a value ("G") of a radio signal strength parameter 112(7). FIG. 1 depicts an example where the radio signal strength parameter 112(7) is a reference signal strength indicator (RSSI) parameter, but this is nonlimiting to the disclosure herein. Other example radio signal strength parameters 112(7) might include, without limitation, a reference signal received quality (RSRQ), a reference signal received power (RSRP), or similar parameters. A higher value ("G") of the radio signal strength parameter 112(7) can mean that high-demand types of services (e.g., gaming, video streaming, etc.) may be supported, while a lower value ("G") of the radio signal strength parameter 112(7) can mean that low-demand types of services (e.g., basic data, emergency, etc.) may be supported.

Additionally, or alternatively, although not depicted in FIG. 1, the operation at 102 can include determining a value of a channel bandwidth parameter. By way of example, 4G networks use relatively low radio frequencies, such as frequencies in bands below 6 GHz. 5G networks are able to use an extended range of frequency bands compared to 4G networks, such as higher frequency bands in the 6-100 GHz spectrum. Frequency bands in the 6-100 GHz spectrum are generally referred as mmWave frequency bands as their wavelength is within the millimeter range. Radio communications using the higher frequency 5G bands may be able to support higher data speeds, but may also have disadvantages compared to the lower frequency bands. Specifically, radio signals in the higher frequencies generally have shorter range and are more easily blocked by physical objects. Accordingly, for these and other reasons, a value (e.g., frequency, frequency range/band, etc.) of a channel bandwidth parameter may be indicative of the types of services supported on the communication device 108.

Additionally, or alternatively, although not depicted in FIG. 1, the operation at 102 can include determining a value of a capability parameter (e.g., for capabilities of the communication device 108, modem to which the device 108 is connected, etc.). For example, the value of the capability parameter may indicate whether the device 108 is a 5G-capable device or not, whether it has a particular radio chip with known capabilities, a model of the device 108, such as a value (e.g., model number) indicative of an outdated device (e.g., a flip phone) that is unable to display video, etc. Accordingly, the value of the capability parameter may indicate whether a device 108 supports all possible types of services, or whether the device 108 supports some, but not all, of the possible types of services, and in the latter case, which types of services are, and/or are not, supported by the device 108 based on its capabilities. A modem being used by the device 108 to connect to the network may likewise have capability limitations that dictate which types of services might be supported on the communication device 108.

Additionally, or alternatively, although not depicted in FIG. 1, the operation at 102 can include determining a value of a location parameter (e.g., a location of the communication device 108, such as a Global Positioning System (GPS) location, a cell identifier that is indicative of location, etc.). Location may be an indicator of a type of service(s) supported on the communication device 108 because certain geographical locations may be known to have good coverage verses bad coverage, more interference verses less interference, etc.

With reference now to the operation 104, after having determined the value(s) of the parameter(s) 112 at operation 102, the determination of a symbol to present on the display of the communication device 108 can be made in various ways. In one example, logic of the communication device 108 may compare a determined value of a parameter 112 to a predetermined range of values corresponding to a particular type of service(s). Other examples of making the determination of a particular symbol 114 to display at operation 104 may include determining whether the value(s) is/are equal to a predetermine value(s) corresponding to a particular type of service(s), and/or determining whether the value(s) satisfies (e.g., meets or exceeds, or strictly exceeds) a threshold value corresponding to a particular type of service(s). If, say, the value of the parameter 112 falls within the predetermined range, the logic may determine that a particular type of service corresponding to the predetermined range is supported on the device 108, which means that the service type symbol 114 for that type of service is a candidate for display.

To illustrate with the CQI parameter 112(1), the operation 104 can include determining whether the value ("A") of the CQI parameter 112(1) is within a predetermined range of CQI values or is equal to a predetermined CQI value (e.g., a CQI value of 7). The predetermined range and/or the predetermined value may correspond to a particular type of service such that the value ("A"), if equal to the predetermined value and/or within the predetermined range, indicates that the particular type of service is supported. Other parameters 112 may be evaluated similarly (e.g., determining whether the value ("B") of the QCI parameter 112(2) is within a predetermined range of QCI values or is equal to a predetermined QCI value, determining whether the value ("C") of the S-NSSAI parameter 112(3) is within a predetermined range of S-NSSAI values or is equal to a predetermined S-NSSAI value, and so on and so forth for any of the parameters 112 described herein). Threshold values may be used similarly to evaluate whether a particular type of service is supported (e.g., determining whether the value ("G") of the radio signal strength parameter 112(7) satisfies a threshold signal strength value, etc.).

In some embodiments, the determination of a symbol to present on the display of the communication device 108 at operation 104 can be made using a policy accessible to the communication device 108, using a machine learning model(s) accessible to the communication device 108, or other suitable ways. In a policy-based determination, the communication device 108 may be configured to access the policy to determine whether one or more criteria are satisfied by a value(s) of a parameter(s) 112 for presenting a given symbol 114 on the display of the communication device 108. In a machine learning-based determination, the communication device 108 may provide a value(s) of a parameter(s) 112 as input to a machine learning model(s), and the machine learning model(s) may generate, as output, a service type symbol 114 to present on the display of the communication device 108.

Machine learning generally involves processing a set of examples (called "training data") in order to train a machine learning model(s). A machine learning model(s), once trained, is a learned mechanism that can receive new data as input and estimate or predict a result as output. For example, a trained machine learning model can comprise a classifier that is tasked with classifying unknown input (e.g., an unknown image) as one of multiple class labels (e.g., labeling the image as a cat or a dog). In some cases, a trained machine learning model is configured to implement a multi-label classification task (e.g., labeling images as "cat," "dog," "duck," "penguin," and so on). Additionally, or alternatively, a trained machine learning model can be trained to infer a probability, or a set of probabilities, for a classification task based on unknown data received as input. In the context of the present disclosure, the unknown input may be a value(s) of a parameter(s) 112 determined at operation 102, and the trained machine learning model(s) may be tasked with outputting scores for the candidate service type symbols 114, and the highest-scoring symbol 114 may be selected as the symbol 114 to present on the display of the communication device 108. In some embodiments, the individual scores output by the machine learning model may be a variable that is normalized in the range of [0,1]. In some embodiments, the trained machine learning model(s) may output a set of probabilities (e.g., two probabilities), or scores relating thereto, for each symbol 114 where one probability (or score) relates to the probability of the corresponding type of service being supported on the device 108, and the other probability (or score) relates to the probability of the corresponding type of service being unsupported on the device 108. The score that is output by the trained machine learning model(s) can relate to either of these probabilities in order to guide the determination of which symbol 114 to present.

The trained machine learning model(s) that may be used by the communication device 108 at operation 104 may represent a single model or an ensemble of base-level machine learning models, and may be implemented as any type of machine learning model. For example, suitable machine learning models for use with the techniques and systems described herein include, without limitation, neural networks, tree-based models, support vector machines (SVMs), kernel methods, random forests, splines (e.g., multivariate adaptive regression splines), hidden Markov model (HMMs), Kalman filters (or enhanced Kalman filters), Bayesian networks (or Bayesian belief networks), expectation maximization, genetic algorithms, linear regression algorithms, nonlinear regression algorithms, logistic regression-based classification models, or an ensemble thereof. An "ensemble" can comprise a collection of machine learning models whose outputs (predictions) are combined, such as by using weighted averaging or voting. The individual machine learning models of an ensemble can differ in their expertise, and the ensemble can operate as a committee of individual machine learning models that is collectively "smarter" than any individual machine learning model of the ensemble. Furthermore, the trained machine learning model(s) may reside on the communication device 108, or on a remote network device accessible to the communication device 108. The machine learning model(s) may be trained offline (e.g., at the remote network device(s)) to utilize the higher computation capabilities of a remote computing system.

The training data that is used to train the machine learning model may include various types of data. In general, training data for machine learning can include two components: features and labels. However, the training data used to train the machine learning model(s) may be unlabeled, in some embodiments. Accordingly, the machine learning model(s) may be trainable using any suitable learning technique, such as supervised learning, unsupervised learning, semi-supervised learning, reinforcement learning, and so on. The features included in the training data can be represented by a set of features, such as in the form of an n-dimensional feature vector of quantifiable information about an attribute of the training data. In general, the example features that can be included in the training data for training the machine learning model(s) described herein may include, without limitation, values of any of the parameters 112 described herein. As part of the training process, weights for machine learning may be set, the weights applying to a set of features included in the training data. In some embodiments, the weights that are set during the training process may apply to parameters that are internal to the machine learning model(s) (e.g., weights for neurons in a hidden-layer of a neural network). The weights can indicate the influence that any given feature or parameter has on the scores that are output by the trained machine learning model. In this manner, it is possible for the machine learning model(s) to "learn" over time the criteria for presenting a particular service type symbol 114. The machine learning approach described herein may be usable in addition to, or as an alternative to, the policy-based approach.

FIG. 1 shows an example set of multiple different symbols 114, sometimes called "service type symbols 114", that can be presented on a display of the communication device 108 to indicate the type of service(s) that is/are supported on the communication device 108 over the network to which the device 108 is presently connected. The example symbols 114 shown in FIG. 1 include an augmented reality (AR) and virtual reality (VR) symbol 114(1) corresponding to an AR service and/or a VR service, a gaming symbol 114(2) corresponding to a gaming service, a video symbol 114(3) corresponding to a video streaming service, a voice symbol 114(4) corresponding to a voice calling service, a web browsing symbol 114(5) corresponding to a web browsing service, a basic data symbol 114(6) corresponding to a basic data service, an emergency symbol 114(7) corresponding to an emergency service, and/or a connected (service availability unknown) symbol 114(8) if, for example, the logic of the device 108 is unable to determine which services might be supported (e.g., based on an inability to determine the value at operation 102, and/or if the determination at operation 102 is made at a below-threshold confidence level, etc.).

The order of the symbols 114(1)-(7) may be according to a hierarchy defined for the symbols 114. That is, the AR/VR service may be considered to be the highest-level or highest-demand service that places a higher demand on network resources relative to the other types of services, while the gaming service may be considered the next-highest-level or next-highest-demand service that places a relatively lower demand on network resources relative to the AR/VR service, yet a relatively higher demand on network resources relative to the remaining types of services, and so on and so forth. In this manner, the determination of which symbol 114 to display at operation 104 may account for this hierarchy by selecting the symbol 114 associated with the highest-level service that is presently supported based on the value(s) of the parameter(s) 112. In an illustrative example, if both a voice calling service and a video streaming service are determined to be supported on the device 108 based at least in part on the value(s) determined at operation 102, the logic of the device 108 may determine, at operation 104, to display the video symbol 114(3) in lieu of displaying the voice symbol 114(4), because a user is likely to understand, intuitively, that, if video streaming is supported, voice calling (and other lower-level or lower-demand service types) is also supported. In another illustrative example, if a basic data service is supported, but a voice calling service is unsupported, based at least in part on the value(s) determined at operation 102, the logic of the device 108 may determine, at operation 104, to display the basic data symbol 114(6) in lieu of displaying the voice symbol 114(4). The use of the defined hierarchy in this manner is a way to conserve display resources by displaying one symbol 114, instead of multiple symbols 114.

It is to be appreciated that the determination of the symbol 114 to present on the display of the communication device 108 at operation 106 may include determining to present a symbol 114 that indicates a type of service(s) that is/are presently unsupported on the communication device 108 over the network to which the communication device 108 is connected. That is, instead of, or in addition to, presenting a symbol 114 to indicate a service(s) that is/are supported, operation 106 may determine to present a symbol 114 to indicate a service(s) that is/are unsupported. In this scenario, the symbol 114 may indicate the unavailability of the type of service through some type of visual indicator that conspicuously conveys to the user of the device 108 the unavailability of the type of service (e.g., the symbol 114 may be grayed out, presented with strike-through, appended with the word "unsupported", etc.).

With reference now to operation 106, the communication device 108 may present, on the display of the communication device 108, the symbol 114 determined (e.g., selected) at operation 104. An example 116 illustrates presenting the video symbol 114(3) via a display 120 of communication device 108, and an example 118 illustrates presenting the voice symbol 114(4) via the display 120 of the communication device 108.

The communication device 108 includes a display 120 for presenting information and for interacting with a user. A status bar 122 is typically shown at the top of the display 120. In this example, the status bar 122 includes a signal strength meter 124, a carrier identifier 126, and a service type symbol 114 (e.g., a video symbol 114(3) in the example 116 and a voice symbol 114(4) in the example 118). The status bar 122 may also indicate the current time of day in a time field 128, and/or other information. Although only two service type symbols 114(3) and 114(4) are illustrated it can be understood that any number of service type symbols 114, such as service type symbols 114(1)-(8) can be used in accordance with the techniques discussed herein.

The signal strength meter 124 illustrates the strength and/or quality of signals or communication channels that have been established with a wireless access point 110 (e.g., a base station, such as one or more of an LTE base station and/or an NR base station). The carrier identifier 126 corresponds to the network carrier or provider whose signals are being used for communications.

The service type symbol 114 indicates the type of service that is being supported on (or supported by) the communication device 108 over the network to which the device 108 is presently connected. More specifically, the displayed service type symbol 114 corresponds to and identifies a type of service (or multiple types of services that are supported on the device 108 over the network), and the symbol 114 may be presented while the device 108 is in an idle state and not actively engaged in a communication session, which lets the user know what types of services are supported, and which are not, and which, in turn, informs the user as to which types of client applications are likely to function properly when launched on the device 108. In the example 116, the video symbol 114(3) indicates that a video streaming service is supported. Thus, the user understands, from the video symbol 114(3), that launching a video streaming client application will result in the ability to stream videos at optimal quality. As mentioned, due to the hierarchy defined for the set of multiple different symbols 114(1)-(7) that correspond to particular types of services, the user may also understand, from the video symbol 114(3), that other lower-level services, such as a voice calling service, a web browsing service, a basic data service, an emergency service, etc., may also be supported in the example 116. It is generally intended for the status bar 122 to show a service type symbol 114 corresponding to the most advanced or highest-capability type of service (sometimes referred to herein as a highest-level or highest-demand type of service) that is supported for use by the communication device 108. In the example 118, the voice symbol 114(4) indicates that a voice calling service is supported. Thus, the user understands, from the voice symbol 114(4), that launching a voice calling client application will result in the ability to make or receive a phone call over the network at optimal quality. The user may also understand, from the voice symbol 114(4), that higher-level types of services, such as a video streaming service, a gaming service, etc., may be unsupported. Other embodiments may of course have different types of services, and may use different symbols 114 corresponding to those types of services.

In some examples, aspects of the process 100 can be performed continuously, on demand, and/or at any regular or irregular intervals to determine a service type symbol 114 to present via a display of a communication device 108. The examples are not intended to be limiting and other example implementations are considered herein.

Figure 2:
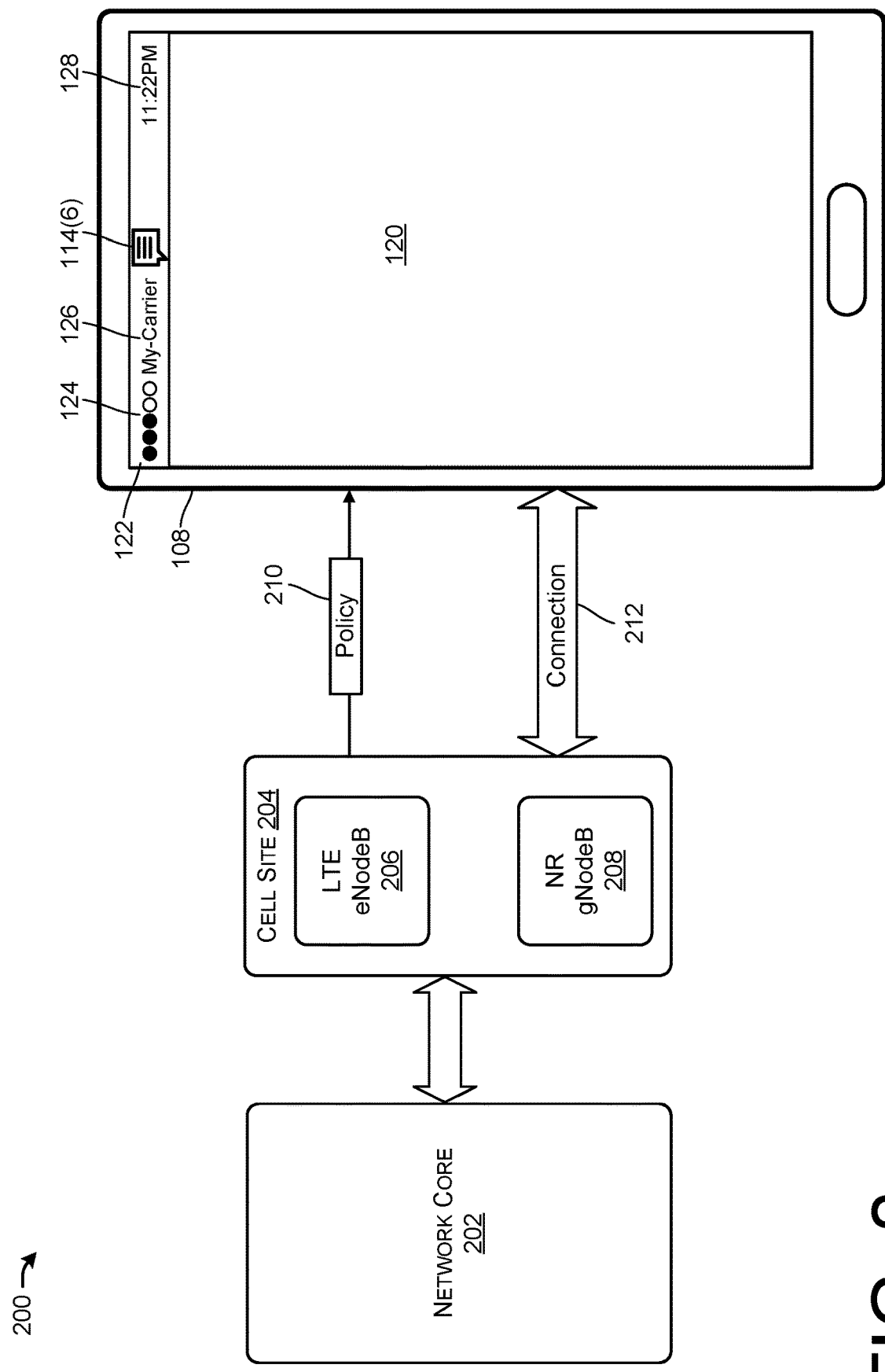
FIG. 2 is a block diagram of a communication network that implements both 4G and 5G technologies and a communication device implementing the techniques discussed herein.

FIG. 2 is a block diagram of a communication network 200 implements both 4G and 5G technologies and a user equipment implementing the techniques discussed herein. The communication network 200 comprises a network core 202, which may include a 4G network core and/or a 5G network core, as an example. The communication network 200 (also referred to as a communication system 200) may comprise multiple cell sites 204, only one of which is shown in FIG. 2 for purposes of discussion.

In some examples, the network core 202 may include 4G core network comprising a Mobility Management Entity (MME), a Serving Gateway (SGW), a Packet Data Network (PDN) Gateway (PGW), a Home Subscriber Server (HSS), an Access Network Discovery and Selection Function (ANDSF), an evolved Packet Data Gateway (ePDG), a Data Network (DN), and the like.

In some examples, the network core 202 can include a 5G core network comprising any of an Access and Mobility Management Function (AMF), a Session Management Function (SMF), a Policy Control Function (PCF), an Application Function (AF), an Authentication Server Function (AUSF), a Network Slice Selection Function (NSSF), a Unified Data Management (UDM), a Network Exposure Function (NEF), a Network Repository Function (NRF), a User Plane Function (UPF), a DN and the like.

The illustrated cell site 204 supports both 4G and 5G communications, and therefore has both 4G and 5G cellular access points. The cell site 204 may be an example of the wireless access point 110 introduced in FIG. 1. The 4G access point is implemented as an LTE base station 206, also referred to as an eNodeB, a master eNodeB, or a master base station. The 5G access point is implemented as an NR base station 208, also referred to as a gNodeB, a secondary gNodeB, or a secondary base station. The network core 202 communicates with the LTE base station 206 and the NR base station 208. In some implementation, radio communications are controlled by the LTE master base station 206. Other communication paths may be used in other embodiments. Note that some cell sites of the system 200 might lack 5G support, and may support only 4G services and communications.

In some instances, the LTE base station 206 is not limited to LTE technology, and may be referred to generally as a first base station 206. In some instances, the NR base station 208 is not limited to NR technology, and may be referred to generally as a second base station 208. In some instances, depending on an implementation, the LTE base station 206 can be referred to as a master base station while the NR base station 208 can be referred to as a secondary base station. In some instances (e.g., in a MR-DC context), depending on an implementation (e.g., Option 4), the LTE base station 206 can be referred to as a secondary base station while the NR base station 208 can be referred to as a master base station. In some instances, the LTE base station 206 and the NR base station 208 may be referred to a base station 206 and a base station 208, respectively.

FIG. 2 also shows a single communication device 108, which may be one of many such devices that are configured for use with the communication network 200. In accordance with various embodiments described herein, the terms "wireless communication device," "wireless device," "communication deice," "cellular communication device," "mobile device," "computing device," "electronic device," "user device," and "user equipment (LSE)" may be used interchangeably herein to describe any communication device 108 capable of performing the techniques described herein. In the described embodiment, the communication device 108 supports both 4G/LTE and 5G/NR networks and communications. Accordingly, the communication device 108 may include an LTE radio (not shown) that communicates wirelessly with a LTE base station 206 of the cell site 204 and an NR radio (not shown) that communicates wirelessly with the NR base station 208 of the cell site 204.

The communication device 108 may comprise any of various types of wireless cellular communication devices that are capable of wireless data and/or voice communications, including smartphones and other mobile devices, "Internet-of-Things" (IoT) devices, smart home devices, computers, wearable devices, entertainment devices, industrial control equipment, etc. Further examples can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network. Additional examples of communication devices include, but are not limited to, smart devices such as televisions, refrigerators, washing machines, dryers, smart mirrors, coffee machines, lights, lamps, temperature sensors, leak sensors, water sensors, electricity meters, parking sensors, music players, headphones, or any other electronic appliances that can generate, request, receive, transmit, or exchange voice, video, and/or digital data over a network.

In general, the communication device 108 can include any device that is capable of transmitting/receiving data wirelessly using any suitable wireless communications/data technology, protocol, or standard, such as Global System for Mobile communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), CBRS, and/or any future Internet Protocol (IP)-based network technology or evolution of an existing IP-based network technology. The communication device 108 can implement enhanced Mobile Broadband (eMBB) communications, Ultra Reliable Low Latency Communications (URLLCs), massive Machine Type Communications (mMTCs), and the like.

The communication device 108 may communicate through either or both of the LTE base station 206 and the NR base station 208. In some instances, the communication device 108 may support Dual Connectivity communications, in which a single communication session might simultaneously use both a 4G connection and a 5G connection. More specifically, the communication device 108 may operate using what is referred to as a Non-Standalone Architecture (NSA), using 5G radio technologies to augment 4G communication capabilities. When using NSA, the communication device 108 can use both an LTE carrier and an NR carrier for downlink data reception and uplink transmissions.

The communication device 108 in FIG. 2 is shown as receiving (e.g., downloading) a policy 210 via the cell site 204. Additionally, or alternatively, other network connections (e.g., via a WiFi router) can be used to download the policy 210. The policy 210 may specify criteria for presenting individual symbols 114 from a set of multiple different service type symbols 114 on the display 120 of the communication device 108. Once received (e.g., downloaded), logic of the communication device 108 may be configured to access the policy 210 to determine whether one or more criteria are satisfied for presenting a given symbol 114 on the display 120. In some embodiments, a criterion for displaying a given symbol 114 may be satisfied by a value of a parameter 112, described above with reference to the process 100, and also described elsewhere herein. For example, a criterion specified in the policy 210 for displaying the basic data symbol 114(6) may be satisfied if a value ("A") of a CQI parameter 112(1) is within a predetermined range of CQI values or is equal to the predetermined CQI value that is insufficient to support higher-level types of services, such as voice calling, video streaming, gaming, AR/VR, etc.

FIG. 2 also illustrates that the communication device 108 may establish a connection 212 with the network (e.g., via the cell site 204 to the network core 202). This connection 212 does not necessarily mean that the device 108 is actively engaged in a communication session (e.g., a voice call). Rather, the device 108 may operate in idle mode and establish the connection 212, which may involve the device 108 receiving an LTE Radio Resource Control (RRC) signal from the LTE base station 206, the RRC signal having been broadcast for reception by multiple communication devices, and containing information regarding capabilities and characteristics of the LTE base station 206. For example, RRC messaging may include information needed by a communication device to establish bi-directional communications with the LTE base station 206. In the LTE environment, at least some of this information may be provided in a periodically broadcast master information block (MIB) and multiple system information blocks (SIBs). It is to be appreciated that the device 108 may not necessarily maintain a connection with the NR base station 208 when the device 108 is operating in idle mode. Furthermore, the NR base station 208 may not transmit SIBs or other RRC signaling. However, 3GPP specifications indicate that the NR base station 208 is to transmit System Frame Numbers (SFNs) that are used for timing of communications.

With a connection established, the device 108 may perform a process, such as the process 100, for presenting, on the display 120, a service type symbol 114 indicative of a type of service supported on the communication device 108. As described herein, the device 108 may determine a value(s) of a parameter(s) 112 in order to determine which service type symbol 114 to present. This may include determining, based on the value(s) of the parameter(s) 112, which of multiple types of services are supported on (or supported by) the communication device 108, and determining, from the corresponding service type symbols 114, a symbol 114 to present on the display 120.

Figure 3A:
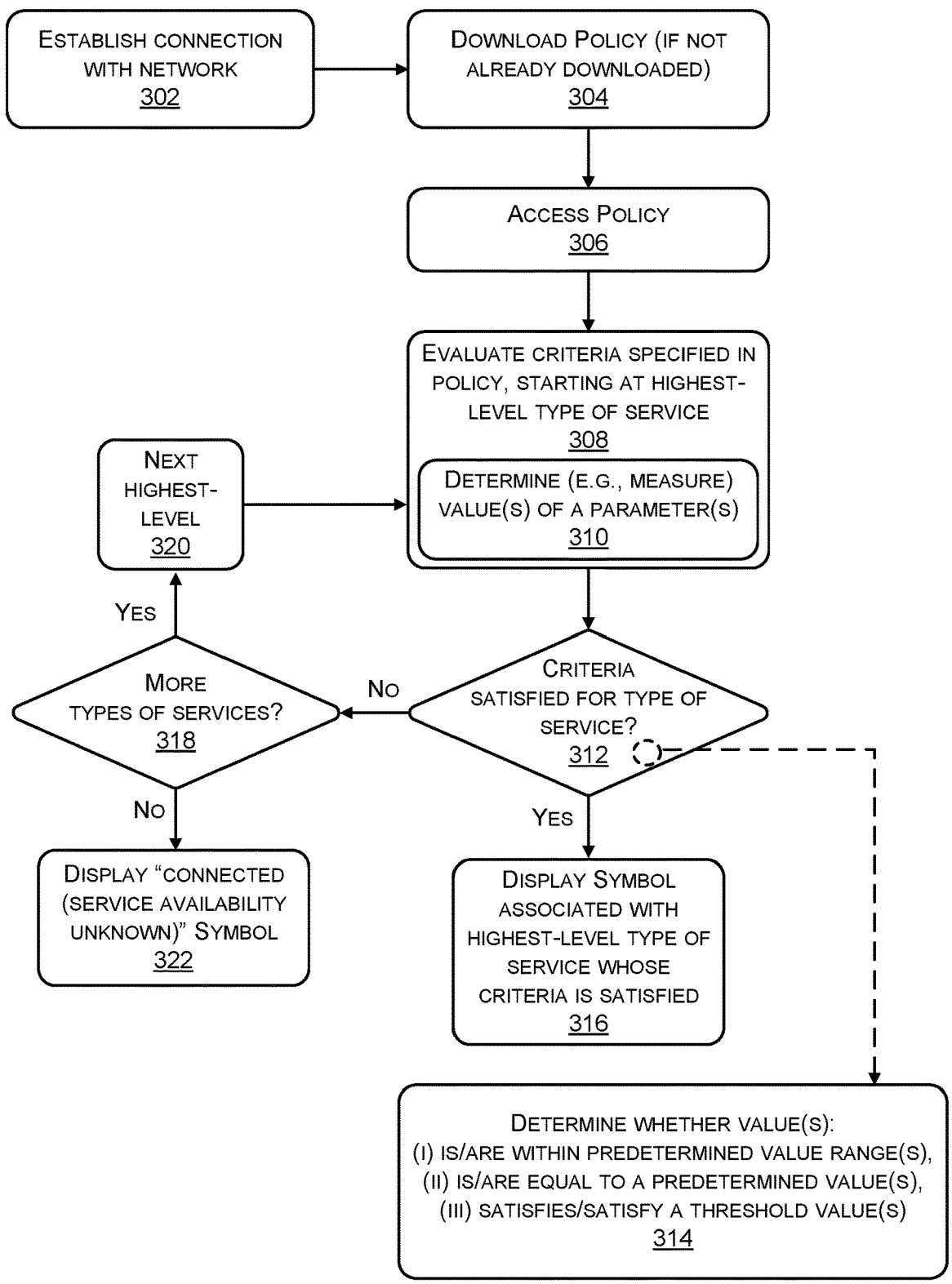
FIG. 3A is an example process implemented by a communication device for displaying a service type symbol indicative of a type of service supported on the communication device based on a policy that specifies criteria for displaying service type symbols on the communication device.

FIG. 3A is an example process 300 for displaying a service type symbol 114 indicative of a type of service supported on the communication device 108 based on a policy 210 that specifies criteria for displaying service type symbols 114 on the communication device 108. The example process 300 can be performed by the communication device 108.

At operation 302, the process can include establishing connection 212 between a communication device 108 and a network (e.g., a cellular network) of a wireless communications provider. At operation 302, the communication device 108 may be connected to the network via a wireless access point 110, such as the cell site 204 of FIG. 2. In some embodiments, the connection 212 established at operation 302 may involve connecting the communication device 108 while the device 108 is not actively involved in a communication session, such as the device 108 operating in an idle state or idle mode. At operation 302, this may involve the device 108 registering for services provided via the network core 202.

At operation 304, the process can include downloading, or otherwise receiving, a policy 210 that specifies criteria for presenting individual symbols 114 from a set of multiple different symbols 114 (e.g., the set of symbols 114(1)-(8) shown in FIG. 1) on the display 120 of the communication device 108, if the policy 210 is not already downloaded.

At operation 306, the process can include accessing the policy 210. For example, logic of the communication device 108 may read data from the policy 210 stored in local memory of the communication device 108.

At operation 308, the process can include evaluating the criteria specified in the policy to determine whether one or more criteria are satisfied for presenting particular service type symbol 114 on the display 120. This evaluation at operation 308 may include starting with the criterion (or criteria) for displaying a service type symbol 114(1) associated with the highest-level type of service. In the example hierarchy shown in FIG. 1, the highest-level type of service may be the AR/VR service, because it may represent a service that is the most computationally intensive to support, thereby requiring more resources, both on the device 108 and in the network (e.g., the network core 202 and/or the cell site 204), to provide the service. Furthermore, as shown by sub-operation 310, as part of evaluating the criteria, the device 108 may determine (e.g., measure) a value(s) of a parameter(s) 112. Determining the value(s) of the parameter(s) 112 is described in more detail elsewhere herein, such as in the discussion regarding operation 102 of the process 100.

At operation 312, the process can include determining whether the criterion (or criteria) under evaluation for the type of service is satisfied. For example, as shown by sub-operation 314, a criterion may be satisfied if the value of a parameter 112 (determined at sub-operation 310) (i) is within a predetermined range of values, (ii) is equal to a predetermined value, and/or (iii) satisfies a threshold value. In some embodiments, this may involve determining if multiple parameter 112 values each satisfy a separate criterion such that multiple criteria are to be satisfied in order to display a particular service type symbol 114. If the criterion (or criteria) is satisfied at operation 312, the process 300 may follow the "YES" route from operation 312 to operation 316.

At operation 316, the process can include displaying a service type symbol 114 associated with the highest-level type of service whose criteria is satisfied. If, for example, the criterion (or criteria) for the AR/VR service (an example of a highest-level type of service) is satisfied at operation 312, the AR/VR symbol 114(1) may be displayed on the communication device 108 at operation 316.

If, at operation 312, the criterion (or criteria) is not satisfied for the type of service under evaluation, the process 300 may follow the "NO" route from operation 312 to operation 318, where the process 300 can include determining whether there are any more types of services to evaluate. If there are more types of services to evaluate according to the policy 210, the process 300 may follow the "YES" route from operation 318 to operation 320, where the process can transition to the next-highest-level type of service, and iterate the operations 308-312 to determine, for the next-highest-level type of service, whether the criterion (or criteria) are satisfied for displaying its corresponding service type symbol 114. Say, for example, that the criteria for the AR/VR service was not satisfied, but the criteria for the gaming service was satisfied at operation 312, the communication device 108 may, at operation 316, display the gaming symbol 114(2) on the display 120. In this manner, the process 300 can iterate over blocks 310, 312 (314), 318, and 320 until criteria for a particular type of service is satisfied, and the corresponding service type symbol 114 is displayed at operation 316.

Alternatively, if none of the criteria specified in the policy 210 is satisfied at operation 312, and there are no more types of services to evaluate at operation 318, the process 300 may follow the "NO" route from operation 318 to operation 322, where the communication device 108 may display the connected (service availability unknown) symbol 114(8). This symbol 114(8) may indicate to the user of the communication device 108 that there is not enough information to determine what types of services might be supported on the communication device 108 at the present moment. In other words, the device 108 may implement this logic because it cannot guarantee the availability of a given service, notwithstanding a successful connection to the network.

Figure 3B:
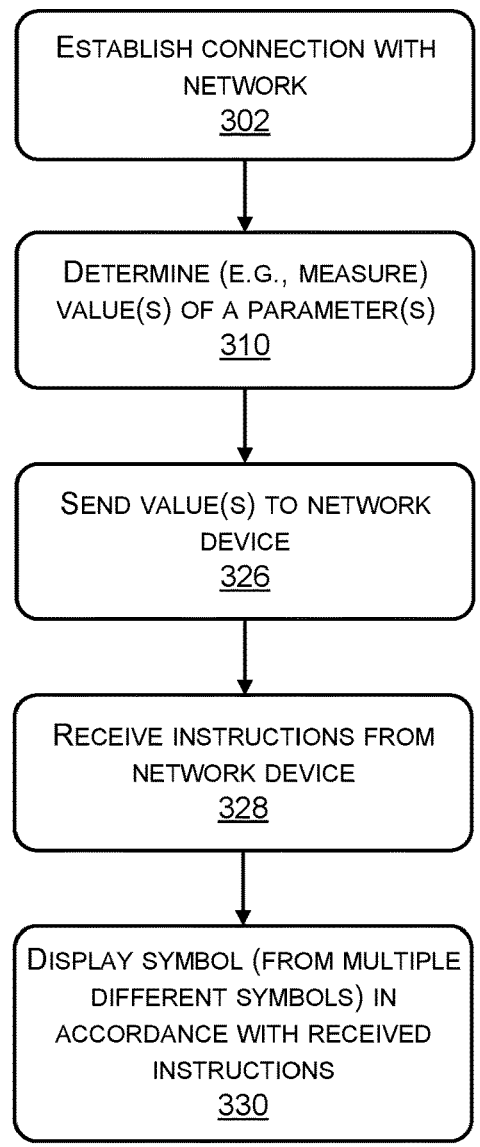
FIG. 3B is an example process implemented by a communication device for displaying a service type symbol indicative of a type of service supported on the communication device based on an instruction received from a network device.

FIG. 3B is an example process 324 for displaying a service type symbol 114 indicative of a type of service supported on the communication device 108 based on an instruction received from a network device. The example process 324 can be performed by the communication device 108.

In some examples, the process 324 can include a similar operations 302 and 310, for establishing a connection with a network, and determining (e.g., measuring) a value(s) of a parameter(s) 112, respectively, as discussed above in connection with the process 300, and as discussed elsewhere herein.

At operation 326, the process 324 can include sending, over the network, the value(s) of the parameter(s) 112 to a network device, such as to a node in the network core 202 via the cell site 204, and/or to the cell site 204. This may allow for the network device/node to receive the value(s) from the communication device 108 and to determine, based on the value(s) of the parameter(s) 112, which service type symbol 114 is to be displayed on the communication device 108.

At operation 328, the process 324 may include receiving, over the network, an instruction from the network device/node. The instruction received at operation 328 may include data for displaying the symbol 114. In other words, if the device 108 does not already have the symbol 114 (or data used to display the symbol 114) in local memory, the device 108 may receive the symbol 114 from the network in real-time and may cache this data for display.

At operation 330, the process 324 can include determining the symbol 114 to display, and/or presenting the symbol 114 on the display 120 of the communication device, based at least in part on the instruction(s) received at operation 328. Accordingly, the process 324 illustrates an example of a network-controlled service type symbol 114 presentation technique whereby a network device/node makes the decision as to which symbol 114 to display and instructs the device 108 to display the symbol 114. By contrast, the process 300 of FIG. 3A illustrates an example of a device-controlled service type symbol 114 presentation technique whereby the device 108 makes the decision as to which symbol 114 to display (e.g., based on a policy 210 accessible to the device 108).

Figure 4:
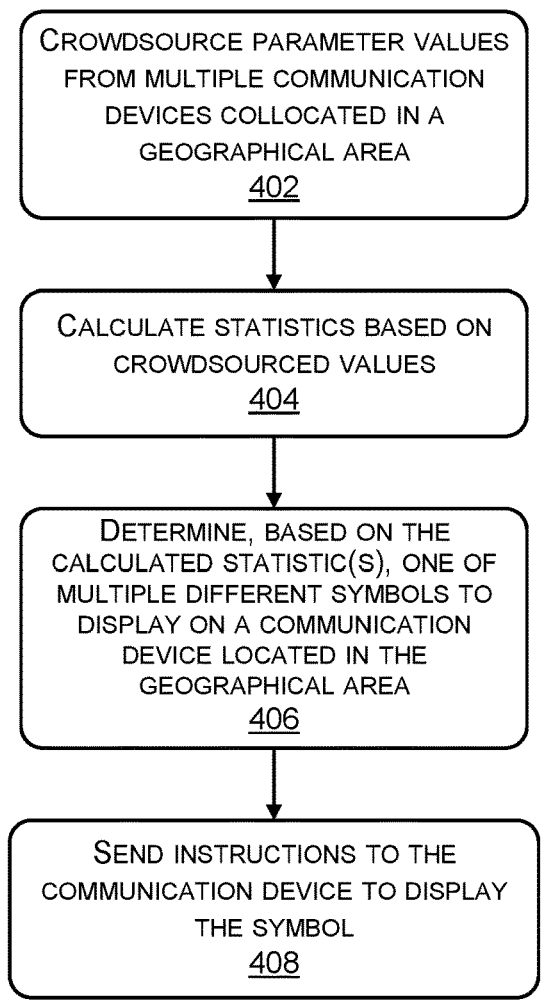
FIG. 4 is an example process implemented by a network device(s) or node(s) for determining a service type symbol to display on a communication device based on crowd-sourced parameter values of the communication device and other communication devices collocated in a geographical area.

FIG. 4 is an example process 400 for determining a service type symbol to display on a communication device 108 based on crowdsourced parameter values of the communication device 108 and other communication devices collocated in a geographical area. The example process 400 can be performed by a network device(s) or node(s), such as a node within the network core 202.

At operation 402, the process 400 can include crowdsourcing parameter values from multiple communication devices that are collocated in a geographical area. This geographical area may be associated with one or multiple cell sites 204 in close proximity. In some embodiments, the communication devices, including the communication device 108, may perform measurements (e.g., by running speed tests, conducting round trip time measurements, etc.) to determine values of parameters 112 that are specific to each communication device. This may provide the network device/node with a larger set of data to determine what the radio conditions are like in a given geographical area, but not just from a single communication device. For instance, some communication devices may have connections with the network that are relatively high-throughput, high-channel quality connections, while other communication devices in the same geographical area may have relatively low-throughput, low-channel quality connections. This can occur for various reasons (e.g., interference, building obstructions, etc.). In this sense, if a given communication device moves to a new location within the geographical area and/or radio conditions change for the communication device, the values of these parameters may change.

At operation 404, the process 400 can include calculating one or more statistics (e.g., mean, median, mode, etc.) based on the crowdsourced parameter values to determine a statistic(s) that is representative of the group of communication devices in the given geographical area. For example, the network device/node may receive multiple radio signal strength measurements, multiple CQI values, etc., and may average the values to determine an average statistic that is representative of a larger set of communication devices in the geographical area.

At operation 406, the process 400 can include determining, based at least in part on the calculated statistic(s), a service type symbol 114, of multiple different service type symbols 114 (e.g., from the set of symbols 114(1)-(8)) to display on a communication device 108 located in the geographical area. In addition to factoring in the calculated statistic(s) at operation 406, the determination may also consider device-specific parameter values that are associated with the specific communication device 108 that is to display the symbol 114. In this manner, the symbol 114 that is to be displayed on a particular device 108 may be partly based on a statistic(s) calculated from crowdsourced data, and partly based on data that is specific to the device 108 in question. This may be useful in situations where a statistic(s) calculated based on crowdsourced data may be more accurate and/or representative of the radio conditions in a given geographical area than a single data point from a single device is.

At operation 408, the process 400 can include sending an instruction(s) to the communication device 108 to display the symbol 114 on its display 120.

Figure 5:
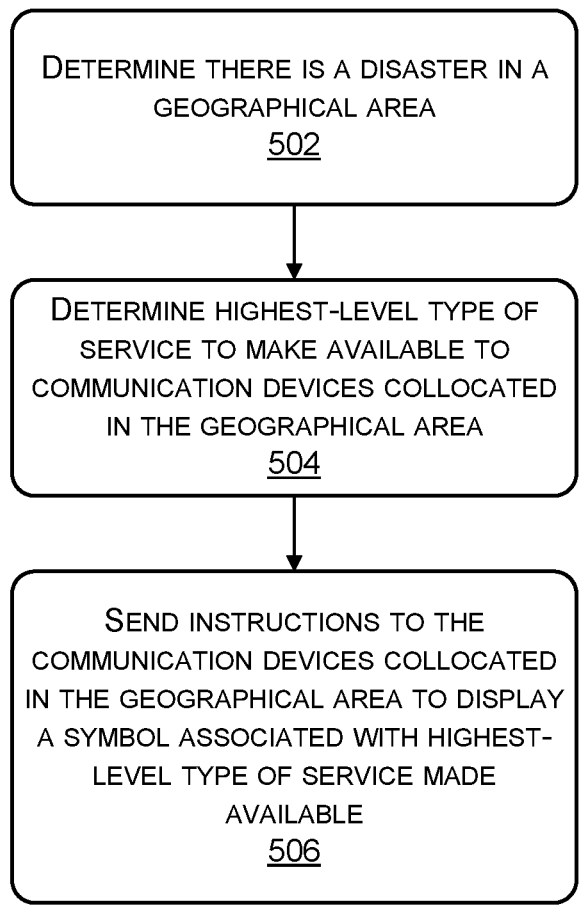
FIG. 5 is an example process implemented by a network device(s) or node(s) for instructing communication devices in a disaster area to display a particular service type symbol.

FIG. 5 is an example process 500 for instructing communication devices in a disaster area to display a particular service type symbol 114. The example process 500 can be performed by a network device(s) or node(s), such as a node within the network core 202.

At operation 502, the process 500 can include determining that there is a disaster in a geographical area. For example, a wireless carrier may configure their cellular network to raise a flag if there are reports (e.g., in news media, which can be distributed/communicated via various channels) of a disaster (e.g., earthquake, flood, wildfire) in a geographical area. For example, if reports in news media (perhaps confirmed by personnel, such as administrators, of a carrier's cellular network) indicate a disaster has occurred in a city in the United States, the operation 502 can include determining that a disaster has occurred in the geographical area corresponding to the city identified in the news reports.

At operation 504, the process 500 can include determining a highest-level type of service to make supported on communication devices that are collocated in the geographical area designated as the location of the disaster. For example, a highest-level type of service to make supported may comprise a voice calling service. In this manner, the communication devices collocated in the geographical area may be barred from accessing any higher-level services, such as video streaming, gaming, AR/VR, etc. This may be enabled using the ACB techniques described herein and generally known to a person having ordinary skill in the art.

At operation 506, the process 500 can include sending instructions to the communication devices collocated in the geographical area to display a service type symbol 114 associated with the highest-level type of service made supported at operation 504. For example, the instructions sent at block 506 may instruct the communication devices to display a voice symbol 114(4) corresponding to a voice calling service. Using the process 500, users of the communication devices in the geographical area will understand that non-critical services, such as video streaming, gaming, AR/VR, etc. are not presently supported on their communication devices. This helps reserve network capacity for essential services, such as emergency services, and other services that may be used during a disaster to connect people with loved ones or otherwise help people survive a disaster.

Figure 6:
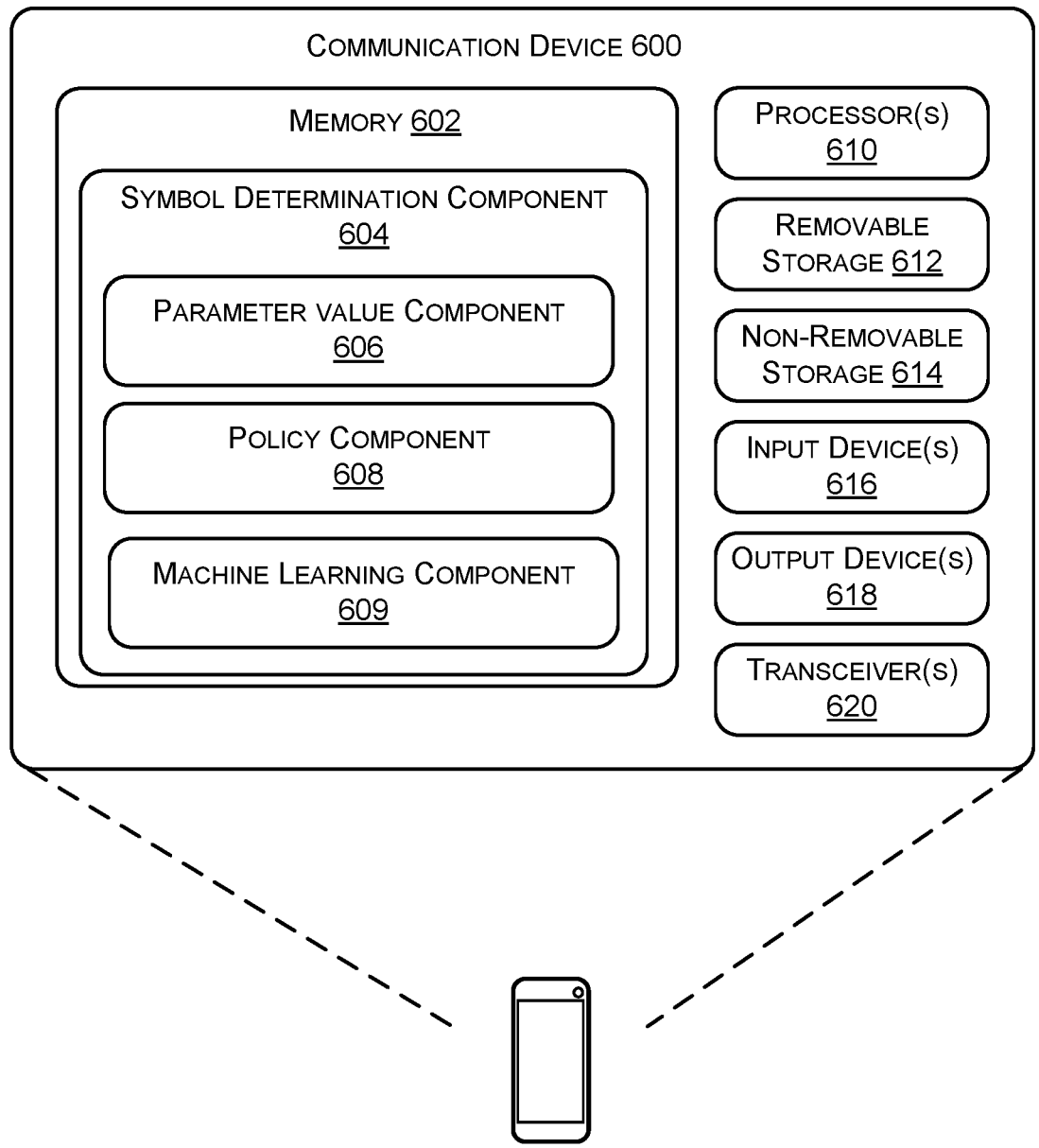
FIG. 6 illustrates an example communication device to implement the service type symbol presentation techniques, as described herein.

FIG. 6 illustrates an example communication device 600 to implement the service type symbol presentation techniques, as described herein. In some embodiments, the communication device 600 can correspond to the communication device 108 described elsewhere herein. It is to be understood in the context of this disclosure that the communication device 600 can be implemented as a single device, as a plurality of devices, or as a system with components and data distributed among them.

As illustrated, the communication device 600 comprises a memory 602 storing a symbol determination component 604, which is shown as comprising a parameter value component 606, a policy component 608, and a machine learning component 609, among other possible components. Also, the communication device 600 includes processor(s) 610, removable storage 612 and non-removable storage 614, input device(s) 616, output device(s) 618, and transceiver(s) 620.

In various embodiments, the memory 602 is volatile (such as RAM), non-volatile (such as ROM, flash memory, etc.) or some combination of the two. The symbol determination component 604, the parameter value component 606, the policy component 608, and the machine learning component 609 stored in the memory 602 can comprise methods, threads, processes, applications or any other sort of executable instructions. The symbol determination component 604, the parameter value component 606, the policy component 608, and the machine learning component 609 can also include files and databases.

In general, the symbol determination component 604 can include functionality to determine a value(s) of a parameter(s) 112, and functionality for displaying or otherwise presenting a service type symbol 114 indicative of an supported type of service, as described herein. In some examples, the symbol determination component 604 can present any of the symbols 114(1)-(8) on a display of the communication device 600 in accordance with the techniques discussed herein.

In some examples, the parameter value component 606 can include functionality to determine, from logic used to establish a network connection over a cellular network, values of parameters 112 such as, without limitation, a CQI parameter 112(1), a QCI parameter 112(2), a S-NSSAI parameter 112(3), a AC parameter 112(4), and the like. In some examples, the parameter value component 606 can include functionality to measure parameter values, such as values of parameters 112 like the data throughput parameter 112(5), network latency parameter 112(6), signal strength parameter 112(7), and the like. In some examples, the parameter value component 606 may hook into a component of the device 600 that provides the device's 600 capabilities to determine capability parameter values, and may hook into a GPS component to determine a GPS location, etc. In some examples, the parameter value component 606 can include functionality to determine values indicative of a device state and/or a network state.

In some examples, client applications executing on the communication device 600 may hook into (e.g., via application programming interface (API) calls) to the symbol determination component 604 in order to provide enhanced features to users (e.g., notifications, warnings, etc.) as to whether the client application is likely to function properly, or, conversely, whether the client application is unlikely to function properly, given the determination of which types of services are presently supported. For example, if the symbol determination component 604 determines to display a voice symbol 114(4) because voice calling is presently supported, but video streaming is presently unsupported, a video streaming client application that is hooked into the symbol determination component 604 may receive this information based on an API call, and may determine to output a notification (e.g., via the a user interface of the client application) that informs the user about a potential for the video streaming application to not function properly. For example, a warning can be provided, such as a message that reads "Your device has determined that a video streaming service is currently unsupported, which may cause videos to stream with poor quality or to not stream at all, are you sure you want to continue?". The user, in this scenario, may decide to close the video streaming client application instead of continuing to try and stream videos via the client application.

In some examples, the policy component 608 can include functionality to receive (e.g., download), determine, and/or access a policy 210 associated with presenting one of multiple different service type symbols 114, as discussed herein. In some examples, the policy component 608 can receive a policy 210 and/or a message or instruction to activate a policy 210 already downloaded to the device 600, for presenting a service type symbol 114 on the display 120 of the device 600. The policy 210 may be set by a component of the network as a means of instructing the device 600 to display particular service type symbols 114 without the device 600 having to receive real-time instructions over the network to do so. In some examples, based on the active policy 210, the symbol determination component 604 can determine a service type symbol 114 to present, as described herein. The active policy 210 may specify one or more criteria that are to be met for displaying particular service type symbols 114, as described herein. The one or more criteria may be specified in terms of parameter values having to fall within predetermined ranges, having to equal predetermined values, and/or having to satisfy predetermined thresholds.

In some examples, the machine learning component 609 can include functionality to utilize a machine learning model(s) to determine which service type symbol 114 to present, as described herein. The trained machine learning model(s) may reside on the device 600, or the machine learning component 609 may utilize a remotely-located machine learning model(s).

Regarding the service type symbols 114, although they are shown as pictorial icons throughout the figures, it is to be appreciated that the symbols 114 can additionally or alternatively include text symbols. For example, the symbol determination component 604 may be configured to display the text "VIDEO" as a symbol 114 to indicate the availability of a video streaming service, or "VOICE" as a symbol 114 to indicate the availability of a voice calling service, or "WEB" as a symbol 114 to indicate the availability of a web browsing service, or "GAME" as a symbol 114 to indicate the availability of a gaming service, or "AR/VR" as a symbol 114 to indicate the availability of an AR service or VR service, or "EMERGENCY" as a symbol 114 to indicate the availability of an emergency service, and so on. In some embodiments, for the lowest-level service in the hierarchy defined for the set of symbols 114, such as the emergency service, the symbol 114 in text form might be "Emergency Service Only".

In some embodiments, the processor(s) 610 is a central processing unit (CPU), a graphics processing unit (GPU), or both CPU and GPU, or other processing unit or component known in the art.

The communication device 600 also includes additional data storage devices (removable and/or non-removable) such as, for example, magnetic disks, optical disks, or tape. Such additional storage is illustrated in FIG. 6 by removable storage 612 and non-removable storage 614. Tangible, non-transitory computer-readable media can include volatile and non-volatile, removable and non-removable media implemented in any method or technology for storage of information, such as computer readable instructions, data structures, program modules, or other data. The memory 602, the removable storage 612 and the non-removable storage 614 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the communication device 600. Any such tangible, non-transitory computer-readable media can be part of the communication device 600.

The communication device 600 may be configured to communicate over a telecommunications network using any common wireless and/or wired network access technology. Moreover, the communication device 600 may be configured to run any compatible device operating system (OS), including but not limited to, Microsoft Windows Mobile, Google Android, Apple iOS, Linux Mobile, as well as any other common mobile device OS.

The communication device 600 also can include input device(s) 616, such as a keypad, a cursor control, a touch-sensitive display, voice input device, etc., and output device(s) 618 such as a display, speakers, printers, etc. These devices are well known in the art and need not be discussed at length here.

As illustrated in FIG. 6, the communication device 600 also includes one or more wired or wireless transceiver(s) 620. For example, the transceiver(s) 620 can include a network interface card (NIC), a network adapter, a LAN adapter, or a physical, virtual, or logical address to connect to various networks, devices, or components illustrated in the network 200, for example. To increase throughput when exchanging wireless data, the transceiver(s) 620 can utilize multiple-input/multiple-output (MIMO) technology. The transceiver(s) 620 can comprise any sort of wireless transceivers capable of engaging in wireless, radio frequency (RF) communication. The transceiver(s) 620 can also include other wireless modems, such as a modem for engaging in Wi-Fi, WiMAX, Bluetooth, infrared communication, and the like.

Figure 7:
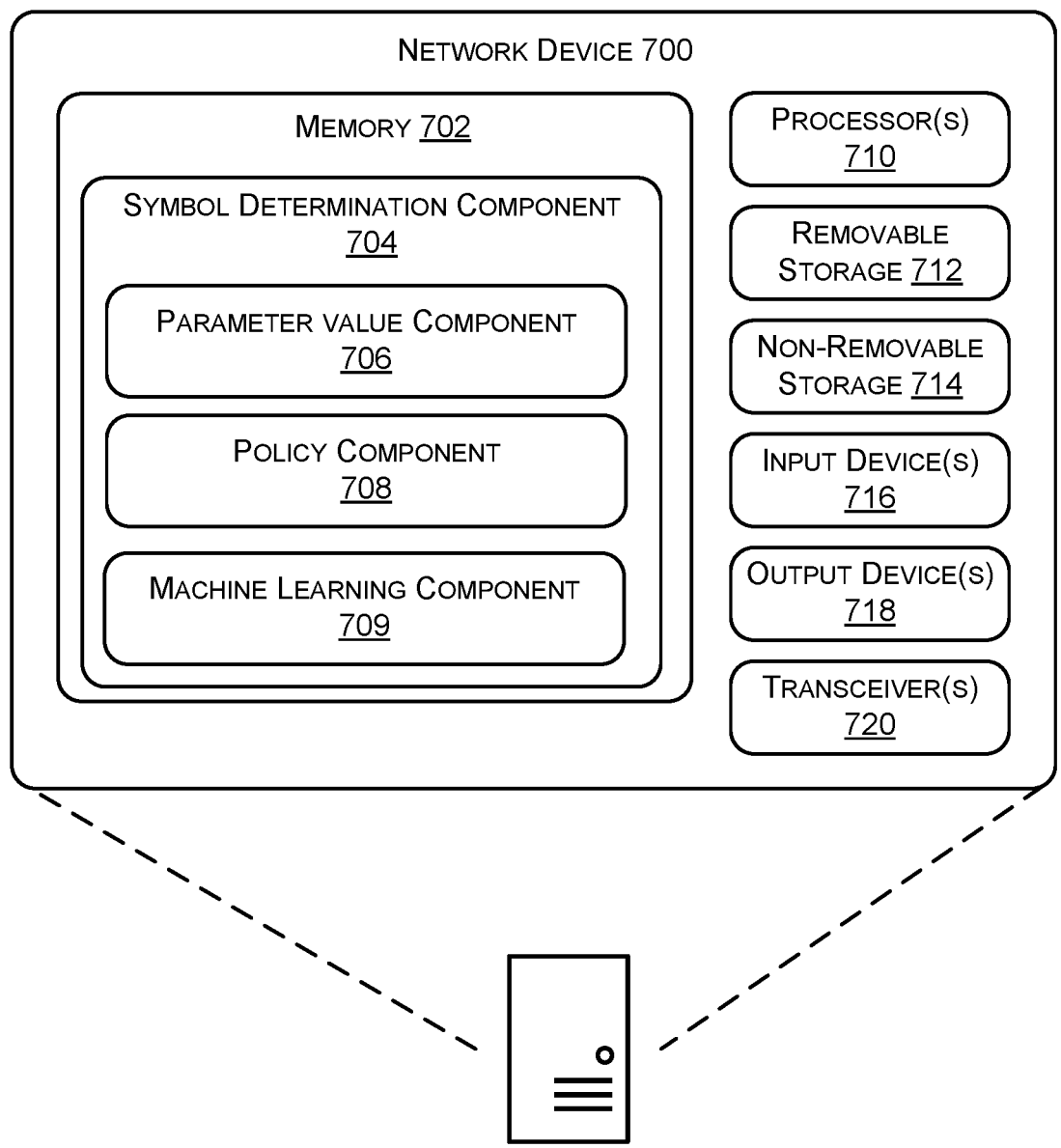
FIG. 7 illustrates an example network device to implement the service type symbol presentation techniques, as described herein.

FIG. 7 illustrates an example network device 700 to implement the service type symbol presentation techniques, as described herein. In some embodiments, the network device 700 can correspond to the network device/node described elsewhere herein, such as the network device/node configured to implement the process 400 and/or the process 500. It is to be understood in the context of this disclosure that the network device 700 can be implemented as a single device, as a plurality of devices, or as a system with components and data distributed among them.

The network device 700 may include a memory 702 comprising a symbol determination component 704, which may comprise a parameter value component 706, a policy component 708, and a machine learning component 709, among other possible components. These components may function similarly to the corresponding components of the communication device 600, yet they may function appropriately for the network device 700. For example, the parameter value component 706 may be configured to determine a value(s) of a parameter(s) 112 for a single communication device, or for multiple communication devices. The policy component 708 may be configured to send policies and policy updates to communication devices over the network. The machine learning component 709 may be configured to train a machine learning model(s) and to download the trained machine learning model(s) to communication devices. The machine learning component 709 may additionally, or alternatively, be configured to receive input data (e.g., parameter values) from a communication device, provide the input data to a trained machine learning model(s) to determine a service type symbol 114 to present, and send instructions to the communication device to present the symbol 114.

The network device 700 is also shown as including a processor(s) 710, removable storage 712, non-removable storage 714, input device(s) 716, output device(s) 718, and transceiver(s) 720. These components may be the same or similar components to the components 610-620 described by way of reference to the communication device 600 of FIG. 6. Accordingly, these components need not be discussed at length here, as reference can be made to the description of the components 610-620 for an understanding of the components 710-720 of the network device 700.

FIGS. 1, 3A, 3B, 4, and 5 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A communication device comprising:
a display;
one or more processors; and
a memory storing computer-executable instructions that, when executed by the one or more processors, cause the one or more processors to:
   determine a value of a parameter, wherein the parameter comprises a Quality of Service Class Identifier (QCI) parameter, and the determining includes determining that the value of the QCI parameter is within a predetermined range of QCI values or is equal to a predetermined QCI value;
   determine, based at least in part on the value of the parameter, a symbol from a set of multiple different symbols to present on the display, the symbol indicating a type of service that is supported on the communication device over a network to which the communication device is presently connected; and
   present the symbol on the display, wherein the symbol comprises at least one of:
      a video symbol indicating that a video streaming service is supported on the communication device over the network; or
      a voice symbol indicating that a voice calling service is supported on the communication device over the network,
   wherein determining the symbol to present on the display is based at least in part on the value of the QCI parameter being within the predetermined range of QCI values or being equal to the predetermined QCI value.

2. The communication device of claim 1, wherein the set of multiple different symbols includes the video symbol, the voice symbol, and at least one of:
   a web browsing symbol to indicate that a web browsing service is supported on the communication device over the network;
   a basic data symbol to indicate that a basic data service is supported on the communication device over the network;
   a gaming symbol to indicate that a gaming service is supported on the communication device over the network;
   an emergency symbol to indicate that an emergency service is supported on the communication device over the network; or
   an augmented reality (AR) and virtual reality (VR) symbol to indicate that an AR service or a VR service is supported on the communication device over the network.

3. The communication device of claim 1, wherein the computer-executable instructions, when executed by the one or more processors, further cause the one or more processors to:
   download a policy that specifies criteria for presenting individual symbols from the set of multiple different symbols on the display; and
   access the policy to determine a criterion for presenting the symbol on the display,
   wherein determining the symbol to present on the display comprises determining that the criterion is satisfied by the value of the parameter.

4. The communication device of claim 1, wherein the computer-executable instructions, when executed by the one or more processors, further cause the one or more processors to:
   send, over the network, the value of the parameter to a network device; and receive, over the network, an instruction from the network device;
  wherein determining the symbol to present on the display is based at least in part on the instruction received from the network device.
5. The communication device of claim 1, wherein the computer-executable instructions, when executed by the one or more processors, further cause the one or more processors to:
  determine a value of a Channel Quality Indicator (CQI) parameter; and
  determine that the value of the CQI parameter is within a predetermined range of CQI values or is equal to a predetermined CQI value,
  wherein determining the symbol to present on the display is further based at least in part on the value of the CQI parameter being within the predetermined range of CQI values or being equal to the predetermined CQI value.
6. The communication device of claim 1, wherein the computer-executable instructions, when executed by the one or more processors, further cause the one or more processors to:
  determine a value of a Single Network Slice Selection Assistance Information (S-NSSAI) parameter; and
  determine that the value of the S-NSSAI parameter is within a predetermined range of S-NSSAI values or is equal to a predetermined S-NSSAI value,
  wherein determining the symbol to present on the display is further based at least in part on the value of the S-NSSAI parameter being within the predetermined range of S-NSSAI values or being equal to the predetermined S-NSSAI value.
7. A communication device comprising:
  a display;
  one or more processors; and
  a memory storing computer-executable instructions that, when executed by the one or more processors, cause the one or more processors to:
    establish a connection with a network;
    determine a value of a parameter;
    determine, based at least in part on the value of the parameter, that both the basic data service and the voice calling service are supported on the communication device over the network;
    determine, based at least in part on the value of the parameter, a symbol from a set of multiple different symbols to present on the display, the symbol indicating a type of service that is supported or unsupported on the communication device over the network, wherein the determining includes determining, based at least in part on a hierarchy defined for the set of multiple different symbols, to present on a voice symbol corresponding to a voice calling service in lieu of presenting a basic data symbol corresponding to a basic data service; and
    present the voice symbol on the display.
8. The communication device of claim 7, wherein the set of multiple different symbols includes the voice symbol, the basic data symbol, and at least one of:
  a video symbol corresponding to a video streaming service;
  a web browsing symbol corresponding to a web browsing service;
  a gaming symbol corresponding to a gaming service;
  an emergency symbol corresponding to an emergency service; or
  an augmented reality (AR) and virtual reality (VR) symbol corresponding to an AR service or a VR service.
9. The communication device of claim 7, wherein the parameter comprises an Access Class (AC) parameter, and wherein the computer-executable instructions, when executed by the one or more processors, further cause the one or more processors to:
  determine that the value of the AC parameter is within a predetermined range of AC values or is equal to a predetermined AC value,
  wherein determining the symbol to present on the display is based at least in part on the value of the AC parameter being within the predetermined range of AC values or being equal to the predetermined AC value.
10. The communication device of claim 7, wherein the parameter comprises an capability parameter associated with the communication device or with a modem to which the communication device is connected, and wherein the computer-executable instructions, when executed by the one or more processors, further cause the one or more processors to:
  determine that the value of the capability parameter is within a predetermined range of values or is equal to a predetermined value,
  wherein determining the symbol to present on the display is based at least in part on the value of the capability parameter being within the predetermined range of values or being equal to the predetermined value.
11. The communication device of claim 7, wherein the parameter comprises a data throughput parameter, and wherein the computer-executable instructions, when executed by the one or more processors, further cause the one or more processors to:
  determine that the value of the data throughput parameter is within a predetermined range of throughput values,
  wherein determining the symbol to present on the display is based at least in part on the value of the data throughput parameter being within the predetermined range of throughput values.
12. A processor-implemented method comprising:
  establishing a connection between a communication device and a network;
  determining a value of a parameter, wherein the parameter comprises a network latency parameter and the determining includes determining that the value of the network latency parameter is within a predetermined range of network latency values;
  determining, based at least in part on the value of the parameter, a symbol from a set of multiple different symbols to present on a display of the communication device, the symbol indicating a type of service that is supported or unsupported on the communication device over the network; and
  presenting the symbol on the display of the communication device, wherein the symbol comprises at least one of:
    a video symbol corresponding to a video streaming service; or
    a voice symbol corresponding to a voice calling service,
  wherein the determining to present the symbol on the display is based at least in part on the value of the network latency parameter being within the predetermined range of network latency values.
13. The processor-implemented method of claim 12, further comprising:

determining a value of a Channel Quality Indicator (CQI) parameter; and determining that the value of the CQI parameter is within a predetermined range of CQI values or is equal to a predetermined CQI value, wherein the determining the symbol to present on the display is further based at least in part on the value of the CQI parameter being within the predetermined range of CQI values or being equal to the predetermined CQI value.

14. The processor-implemented method of claim 13, further comprising:

determining a value of a Quality of Service Class Identifier (QCI) parameter; and determine that the value of the QCI parameter is within a predetermined range of QCI values or is equal to a predetermined QCI value, wherein the determining the symbol to present on the display is further based on the value of the QCI parameter being within the predetermined range of QCI values or being equal to the predetermined QCI value.

15. The processor-implemented method of claim 12, further comprising:

determining a value of a Single Network Slice Selection Assistance Information (S-NSSAI) parameter; and determining that the value of the S-NSSAI parameter is within a predetermined range of S-NSSAI values or is equal to a predetermined S-NSSAI value, wherein the determining to present the symbol on the display is further based at least in part on the value of the S-NSSAI parameter being within the predetermined range of S-NSSAI values or being equal to the predetermined S-NSSAI value.

16. The processor-implemented method of claim 12, further comprising:

downloading a policy that specifies criteria for presenting individual symbols from the set of multiple different symbols on the display of the communication device; and accessing the policy to determine a criterion for presenting the symbol on the display, wherein the determining the symbol to present on the display comprises determining that the criterion is satisfied by the value of the parameter.

* * * * *